UNITED STATES PATENT OFFICE.

HARRIE MORRIE, OF ROCKFORD, ILLINOIS.

IMPROVEMENT IN ROOFING COMPOUNDS.

Specification forming part of Letters Patent No. 116,983, dated July 11, 1871.

*To all whom it may concern:*

Be it known that I, HARRIE MORRIE, of Rockford, in the county of Winnebago and State of Illinois, have invented an Improved Compound for Roofing Purposes; and I do hereby declare that the following is a full, clear, and exact description thereof, enabling those skilled in the art to make and use the same.

To prepare the compound, take the following ingredients in about the proportions named: Fifty-two gallons of the ordinary coal-tar of commerce, to be boiled down to about twenty-six gallons. With this residuum, while hot, mix fifty pounds of pitch, agitating the mixture until the pitch is dissolved and has thoroughly combined with the tar. Let the mixture partially cool, and then add twenty-five pounds of water-lime cement, twenty pounds of marble-dust, twenty pounds plaster of Paris, ten pounds of soapstone, twenty-five pounds of ground slate, two pounds of native rubber cut in benzine, and fifty pounds of pulverized red lead mixed with three gallons of raw linseed-oil. In the mean time dissolve five pounds of potash, ten pounds of gum shellac, ten pounds of glue, and twenty pounds of asphaltum in a sufficient quantity of boiling water, and add this mixture with that heretofore described.

In making a new roof a sufficient quantity of the above composition is taken and enough sand added to give to it the consistency of common mortar. This is spread on the boards of the roof to the thickness of about one-fourth of an inch, and left to dry. As soon as it becomes thus dried and hard it is coated, by means of a brush, with the composition, sufficiently heated to a semi-fluid state for that purpose, without the admixture of sand.

For recoating and repairing old roofs my composition is applied in a semi-fluid state with a large brush. The rays of the sun readily dry and harden it, and, though elastic, it is not liable to run, so that the use of sand or gravel may be dispensed with, and the weight of a roof, which is very considerable and objectionable when sand or gravel is thus employed, materially reduced.

What I claim as my invention, and desire to secure by Letters Patent, is—

The manufacture or preparation of a compound for roofing purposes of the ingredients and in substantially the proportions set forth.

In testimony whereof I have signed my name to this specification in the presence of two subscribing witnesses.

HARRIE MORRIE.

Witnesses:
   DAVID R. JUDKINS,
   PATRICK O'BRIEN.